(12) United States Patent
Fouillet et al.

(10) Patent No.: US 10,371,135 B2
(45) Date of Patent: Aug. 6, 2019

(54) MICROPUMP HAVING A FLOWMETER, AND METHOD FOR PRODUCING SAME

(75) Inventors: Yves Fouillet, Voreppe (FR); Olivier Fuchs, Fontaine (FR)

(73) Assignee: Commissariat a l'energie atomique at aux energies alternatives, Paris (FR)

( * ) Notice: Subject to any disclaimer, the term of this patent is extended or adjusted under 35 U.S.C. 154(b) by 363 days.

(21) Appl. No.: 14/114,009

(22) PCT Filed: Apr. 27, 2012

(86) PCT No.: PCT/EP2012/057852
§ 371 (c)(1),
(2), (4) Date: Oct. 25, 2013

(87) PCT Pub. No.: WO2012/146753
PCT Pub. Date: Nov. 1, 2012

(65) Prior Publication Data
US 2014/0044568 A1    Feb. 13, 2014

(30) Foreign Application Priority Data

Apr. 28, 2011   (FR) ..................... 11 53644

(51) Int. Cl.
*F04B 43/04* (2006.01)
*F04B 17/00* (2006.01)
*F04B 19/06* (2006.01)

(52) U.S. Cl.
CPC .......... *F04B 43/046* (2013.01); *F04B 17/003* (2013.01); *F04B 19/06* (2013.01); *Y10T 29/49229* (2015.01)

(58) Field of Classification Search
CPC ...... F04B 17/003; F04B 19/06; F04B 43/046; Y10T 29/49229
(Continued)

(56) References Cited

U.S. PATENT DOCUMENTS 4,596,575 A    6/1986  Rosenberg et al.
5,157,699 A   10/1992  Miyazaki et al.
(Continued)

FOREIGN PATENT DOCUMENTS

CN    1054119 A    8/1991
CN    1675468 A    9/2005
(Continued)

OTHER PUBLICATIONS

English Translation of FR 2942316 A1 (Rey), Aug. 2010.*
(Continued)

*Primary Examiner* — Dominick L Plakkoottam
*Assistant Examiner* — Connor J Tremarche
(74) *Attorney, Agent, or Firm* — Oblon, McClelland, Maier & Neustadt, L.L.P.

(57) ABSTRACT

A micropump with a deformable membrane, including: a first chamber, one wall of which includes a first deformable membrane portion and an actuator of the first membrane portion; a second chamber including a second deformable membrane portion and a third chamber, including a third deformable membrane portion, the second chamber and the third chamber being connected together through a first channel, at least one of the second and third chambers being connected through a second channel to the first chamber; each of the second chamber and third chamber including a mechanism forming a detection gauge, but not including an activation mechanism.

23 Claims, 10 Drawing Sheets

Figure 1:
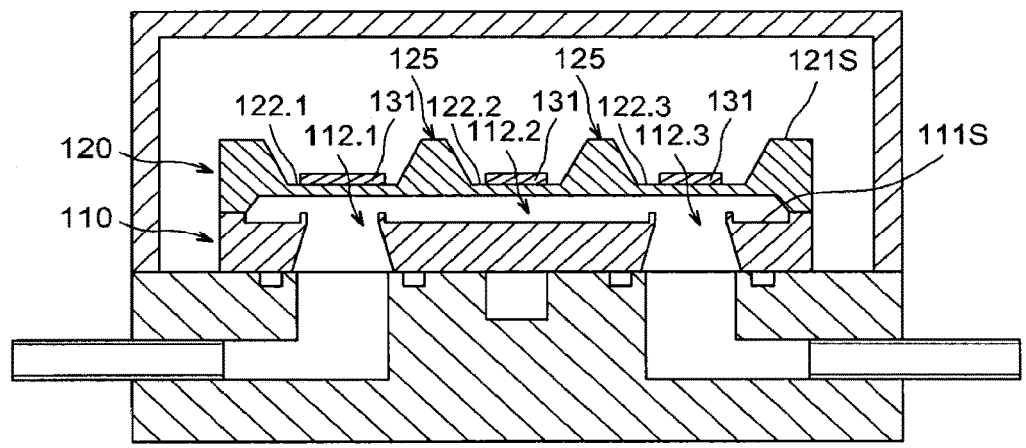

(58) Field of Classification Search
USPC .......... 417/413.2, 413.3, 394, 395, 521, 531
See application file for complete search history.

(56) References Cited

U.S. PATENT DOCUMENTS

| | | | |
|---|---|---|---|
| 5,171,132 A | 12/1992 | Miyazaki et al. | |
| 5,239,319 A | 8/1993 | Miyazaki et al. | |
| 5,248,904 A | 9/1993 | Miyazaki et al. | |
| 5,259,737 A * | 11/1993 | Kamisuki | B81B 3/0005 257/E21.233 |
| 5,725,363 A * | 3/1998 | Bustgens | F04B 43/043 417/207 |
| 6,395,638 B1 * | 5/2002 | Linnemann | F04B 43/043 417/413.1 |
| 6,446,513 B1 | 9/2002 | Henderson | |
| 6,869,273 B2 * | 3/2005 | Crivelli | B01F 5/0415 137/828 |
| 6,962,088 B2 * | 11/2005 | Horiuchi | G01L 3/1457 73/862.338 |
| 7,094,040 B2 * | 8/2006 | Higashino | F04B 43/043 417/413.2 |
| 7,104,768 B2 | 9/2006 | Richter et al. | |
| 8,016,573 B2 | 9/2011 | Kitahara et al. | |
| 8,601,885 B2 | 12/2013 | Delapierre et al. | |
| 9,163,965 B2 * | 10/2015 | Fouillet | G01F 1/38 |
| 2005/0123420 A1 | 6/2005 | Richter et al. | |
| 2005/0204828 A1 | 9/2005 | Lee et al. | |
| 2006/0186085 A1 * | 8/2006 | Fuertsch | F04B 43/043 216/41 |
| 2007/0243627 A1 * | 10/2007 | Takayama | B01L 3/502715 436/180 |
| 2009/0148318 A1 | 6/2009 | Kamitani et al. | |
| 2009/0181411 A1 * | 7/2009 | Battrell | B01F 11/0071 435/7.92 |
| 2009/0232680 A1 | 9/2009 | Kitahara et al. | |
| 2011/0290037 A1 | 12/2011 | Delapierre et al. | |
| 2012/0224981 A1 | 9/2012 | Fouillet et al. | |
| 2013/0175171 A1 | 7/2013 | Aizel et al. | |

FOREIGN PATENT DOCUMENTS

| | | | |
|---|---|---|---|
| CN | 101103200 A | 1/2008 | |
| CN | 101490419 A | 7/2009 | |
| EP | 0 435 653 | 7/1991 | |
| EP | 0 439 327 A1 | 7/1991 | |
| EP | 0 439 327 B1 | 7/1991 | |
| EP | 0 435 653 B1 | 6/1994 | |
| FR | 2942316 A1 * | 8/2010 | ............. G01L 1/148 |
| WO | WO 2010/092092 A1 | 8/2010 | |

OTHER PUBLICATIONS

International Search Report dated Jun. 26, 2012 in PCT/EP12/057852 Filed Apr. 27, 2012.
U.S. Appl. No. 14/406,795, filed Dec. 10, 2014, Marchalot, et al.
Combined Office Action and Search Report dated Jul. 29, 2015 in Chinese Patent Application No. 201280032808.7 (with English translation and English translation of category of cited documents).
U.S. Appl. No. 14/114,445, filed Oct. 28, 2013, Fouillet, et al.
French Preliminary Search Report dated Feb. 14, 2012 in Patent Application No. 1153644 (with English translation of categories of cited documents).
Nam-Trung Nguyen, et al., "MEMS-micropumps: A review", Journal of Fluids Engineering, vol. 124, Jun. 2002, pp. 384-392.
R.E. Oosterbroek, et al., "A micromachined pressure/flow-sensor", Sensors and Actuators, vol. 77, 1999, pp. 167-177.
Alexander F. Doll, et al, "A novel artificial sphincter prosthesis driven by a four-membrane silicon micropump", Sensors and Actuators A, vol. 139, 2007, pp. 203-209.
Z.J. Pei, et al., "Grinding of silicon wafers: A review from historical perspectives", International Journal of Machine Tools & Manufacture, vol. 48, 2008, pp. 1297-1307.
C. Malhaire, et al., "Design of a polysilicon-on-insulator pressure sensor with original polysilicon layout for harsh environment", Thin Solid Films, vol. 427, 2003, pp. 362-366.
Nadim Maluf, et al, "An introduction to microelectromechanical systems engineering", Microelectromechanical Systems Series, Second Edition, 2004, 296 Pages.
Office Action issued in Chinese Patent Application No. 201280032808.7 dated May 9, 2016 with English Translation.

* cited by examiner

MICROPUMP HAVING A FLOWMETER, AND METHOD FOR PRODUCING SAME

TECHNICAL FIELD AND PRIOR ART

The present invention relates to the general field of microfluidics, and deals with a method for manufacturing a micropump with a deformable membrane, provided with a flowmeter with a deformable membrane, as well as with a micropump with a deformable membrane provided with a flowmeter.

Micropumps give the possibility of ensuring controlled flow of a fluid in a microchannel. They may occur in many microfluidic systems such as, as examples, laboratories on a chip, systems for injecting medical substances or further hydraulic circuits for cooling electronic chips.

The flow of the fluid may be obtained in different ways, depending on whether one acts mechanically or not on the fluid of interest. A presentation of the different techniques may be found in the article of Nguyen et al. entitled <<MEMS-Micropumps: A Review>>, 2002, J. Fluid. Eng., Vol. 124, 384-392.

Micropumps with a deformable membrane belong to the first category of micropumps in which mechanical action is applied to the fluid via said membrane, so as to cause displacement of the fluid in the microchannel.

Document US2005/0123420 describes an example of such a micropump including three deformable membranes, including a central pumping membrane and two upstream and downstream secondary membranes.

As illustrated in FIG. 1, this micropump includes a first substrate 110 and a second substrate 120 assembled to each other so as to form a microchannel.

The first substrate 110 includes three cavities 112-1, 112-2, 112-3 formed in the upper face 111S of the substrate and connected in series.

The second substrate 120 includes three deformable membranes 122-1, 122-2, 122-3 positioned facing said cavities. It should be noted that the second substrate 120 is formed in one piece, the deformable membranes then being a portion of said substrate and not being added parts.

The central membrane 122-2 and the corresponding cavity 112-2 delimit together the pumping chamber of the micropump. The upstream 122-1 and downstream 122-3 membranes form active valves with their corresponding cavities 112-1 and 112-3.

The deformation of the membranes is obtained by means of piezoelectric platelets 131 positioned on the upper face 121S of the membranes.

The flow of the fluid of interest in the microchannel of the micropump is obtained by controlled deformation of the membrane which increases or decreases the volume of the pumping chamber, together with the action of the upstream and downstream valve.

It turns out that for certain applications, it is sought to measure the flow rate of the pump. This is for example the case of implantable pumps for delivering a drug.

Peristaltic membrane pumps of the state of the art do not integrate any sensors allowing measurement of the flow rate. The only solution is to connect a flowmeter downstream or upstream from the pump, which complicates the making and miniaturization of the implantable device. Moreover, in order to avoid any measurement bias, it would be preferably to conduct the measurement as close as possible to the pump or even in the pump.

There exist many methods for measuring flow rate (hot wire, Coriolis effect . . . ).

One method consists of using two pressure sensors positioned consecutively in a fluidic passage and separated by a fluidic restriction. The pressure difference (called pressure drop) induced by the viscous dissipation in the fluidic restriction is measured with two pressure sensors. There is a known proportionality relationship between the flow rate and the pressure difference. Thus, the measurement of the pressure difference allows determination of the flow rate.

Figure 2:
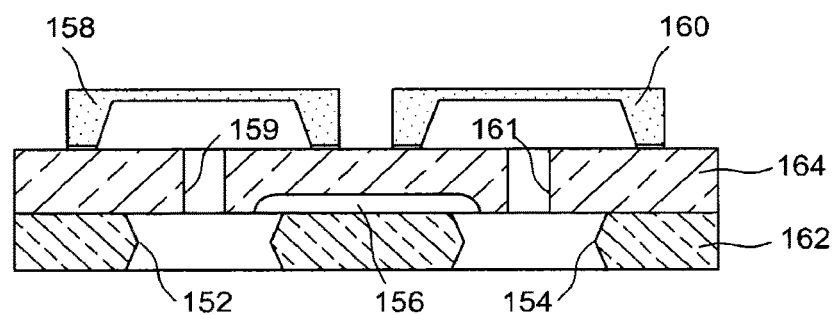

An exemplary flowmeter formed with two distinct pressure sensors is illustrated in FIG. 2 and is described in documents U.S. Pat. No. 6,446,513B1, US20050204828A1 as well as in the article of R. E. Oosterbroek et al., published in Sensor Actuate. A-Phys 77, 167 (1999). The fluid passes through a central channel 156 after having entered through an inlet aperture 152 positioned in the lower portion of the device. It flows out through an outlet aperture 154, also positioned in the lower portion of the device. Piezo-resistive sensors, 158, 160 allow measurement of the pressure variations, in the inlet portion upstream from the channel 156 on the one hand, in the outlet portion downstream from the channel 156 on the other hand. The device is made by means of two substrates 162, 164, the inlet 152 and outlet 154 channels being made in the lower substrate 162, the central channel being as for it made in the lower portion of the upper substrate 164, wherein two through-channels allow access to the piezo-resistive sensors, on the side of the inlet and on the side of the outlet of the device, respectively.

More generally, there exist only very few examples of a pump based on MEMS technologies which integrate sensors measuring the pressure or the rate of flow and no membrane pump, notably made in MEMS technology, which integrates a reliable and accurate flowmeter.

DISCUSSION OF THE INVENTION

A micropump with a deformable membrane is described herein, including:
   a first chamber, a so-called pumping chamber, a wall of which includes a first deformable membrane and means for actuating this first membrane portion,
   a second chamber provided with a second deformable membrane or second deformable membrane portion, and a third chamber, provided with a third deformable membrane or third deformable membrane portion, the second chamber and the third chamber being connected together through a first channel, at least one of them being connected through a second channel to the first chamber.

Each of the second chamber and third chamber include detection means—for example in the form of at least one detection gauge—in order to detect a deformation of the corresponding membrane portion under the action of a fluid flowing in the micropump, but is not provided with activation means.

A membrane pump is therefore described, for example made in MEMS technology, comprising at least one pumping chamber on the one hand and at least two chambers dedicated to the measurement of flow, each including detection means, for example at least one gauge, on the other hand, both of these chambers being separated by a pressure drop with fixed geometry.

For example:
   each of the second chamber and third chamber is provided with 4 gauges forming a Wheatstone bridge,
   or else each of the second and third chamber is provided with 2 gauges, these 4 gauges forming a Wheatstone bridge; it is then sought preferably to have the 4 gauges of the Wheatstone bridge not all parallel to each other and/or have both gauges of the bridge and of a same membrane not parallel with each other, and/or have the Wheatstone bridge include two successive gauges parallel relatively to each other.

Each of the second chamber and third chamber may be provided with 2 gauges, these 4 gauges forming a Wheatstone bridge and having identical rated values.

Several configurations may be applied, for example:
the second chamber and the third chamber may both be located on a same side of the first chamber, one of them only being connected through the second channel to the first chamber,
or else the second chamber and the third chamber may be located on either side of the first chamber, each being connected through a channel to the first chamber.

This device may further include at least one fourth chamber, connected to one of the other chambers and provided with a fourth deformable membrane and means for actuating this fourth membrane.

The fourth chamber, its deformable membrane portion and its actuation means may form a valve.

Preferably, the device includes a fifth chamber, connected to one of the other chambers, and provided with a fifth deformable membrane and means for actuating this fifth membrane. The fifth chamber, its deformable membrane portion and its actuation means may form a valve.

In this case, the first, fourth and fifth membranes are actuated so as to generate a peristaltic effect between the inlet and the outlet of the chamber, as this is for example described in application FR09 57995, not published at the moment of the filing of the present application; in other words, the flow of the fluid of interest in the micropump is obtained by controlled deformation of the $1^{st}$, $4^{th}$ and $5^{th}$ membrane, a deformation which increases or decreases the volume of the corresponding chamber.

According to this embodiment, the fourth chamber may be called an inlet chamber and the fifth chamber may be called an outlet chamber. In this case, the pumped fluid successively passes through the fourth chamber, the first chamber and the fifth chamber. The second and third chambers are then positioned between the fourth chamber and the fifth chamber.

Preferably, a conduit opens into the inside of the fourth chamber, and/or of the $5^{th}$ chamber through an aperture edged with a protruding lip inside said fourth chamber in parallel with said fourth deformable membrane and/or $5^{th}$ deformable membrane.

The different deformable membranes may be portions of a same membrane for which the thickness is for example comprised between 10 µm and 300 µm.

Each membrane covers the chamber with which it is bound or associated or of which it forms one of the walls or at least one portion of one of its walls, the connection being made along an area, a so-called anchoring area.

Each of the second and third membranes includes a means for measuring the deformation of the membrane. This means may be a deformation gauge or a strain gauge, either piezoelectric or piezo-resistive.

Preferably, each gauge is placed at the location of the membrane where it is possible to measure the maximum deformation, i.e. at the anchoring area.

According to another embodiment, each of the third and fourth membranes includes four strain gauges mounted as a Wheatstone bridge. Advantageously, in this case, the gauges positioned on a same membrane are positioned parallel with each other.

According to a preferred embodiment, the third and fourth membranes each include two gauges, positioned perpendicularly to each other, one being oriented tangentially to the anchoring. The four gauges formed on the third and fourth membranes are then mounted according to a Wheatstone bridge.

The gauges may be positioned and/or have either one or both of the following features:
each of the gauges is localized in the vicinity of the anchoring or of the edge of the membrane corresponding to the chamber with which this gauge is associated,
each of the gauges has a width comprised between 1 µm and 10 µm and a length comprising 10 µm and 100 µm.

A method for making a flowmeter is also described, notably of the type described above, including at least the following steps:
a) a first substrate and a second substrate are selected,
b) the chambers and the first channel in the first substrate are made,
c) the first substrate is assembled with the second substrate,
d) and a deformable membrane is then made by thinning the second substrate,
e) means for detecting the deformation of membranes are formed on or in said membrane, at least one such means being positioned above the second chamber and at least one such means being positioned above the third chamber,
f) actuation means are formed on at least the first membrane.

The deformable membrane may be made by thinning the second substrate from the upper face of the latter, by mechanical polishing, or by mechano-chemical polishing and/or by etching.

The second substrate may be of the SOI type including a semiconducting substrate, a dielectric layer and a layer in a semiconducting material, the dielectric layer may be used as a stopping layer during the thinning of the second substrate.

Such a method may further include:
a step for making a fourth chamber, connected to one of the other chambers and provided with a fourth deformable membrane, and a step for making means for actuating this fourth membrane.

Such a method may further include:
a step for making a fifth chamber, connected to one of the other chambers, and provided with a fifth deformable membrane, and a step for making means for actuating this fifth membrane,
and/or a step for making inlet and outlet conduits in the first substrate, the inlet and outlet conduits may first be made blind in the first substrate, and then made as through-conduits, by thinning the first substrate.

The steps for making the chambers and the channels may be applied simultaneously, according to dry etching or wet etching techniques.

The assembling step may be achieved by molecular sealing, by anodic, eutectic sealing, or by adhesive bonding. It may be achieved in vacuo.

Preferably, the thinning of the first substrate is achieved while at least the chambers and the channel are in vacuo or under a very low pressure.

As regards the gauges, the latter may be made by metal deposition on the membrane or by doping a semiconducting material.

SHORT DESCRIPTION OF THE DRAWINGS

Figure 3:
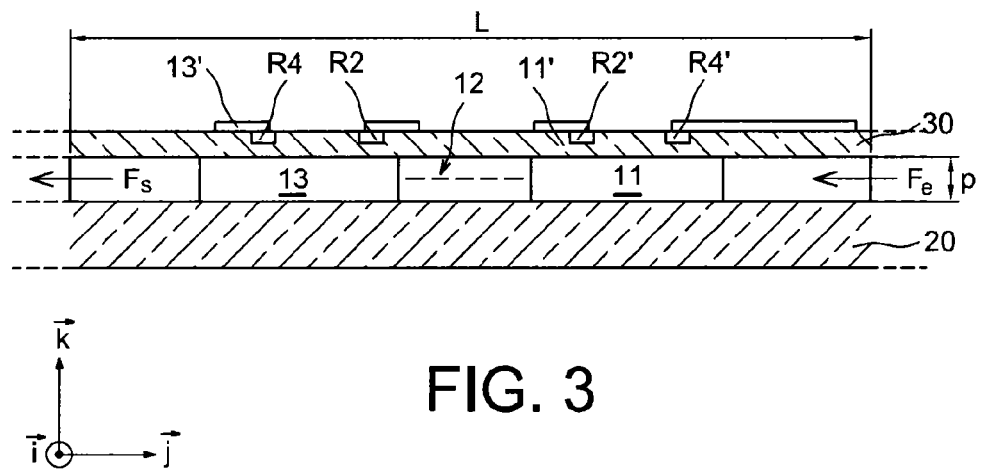
Figure 4A:
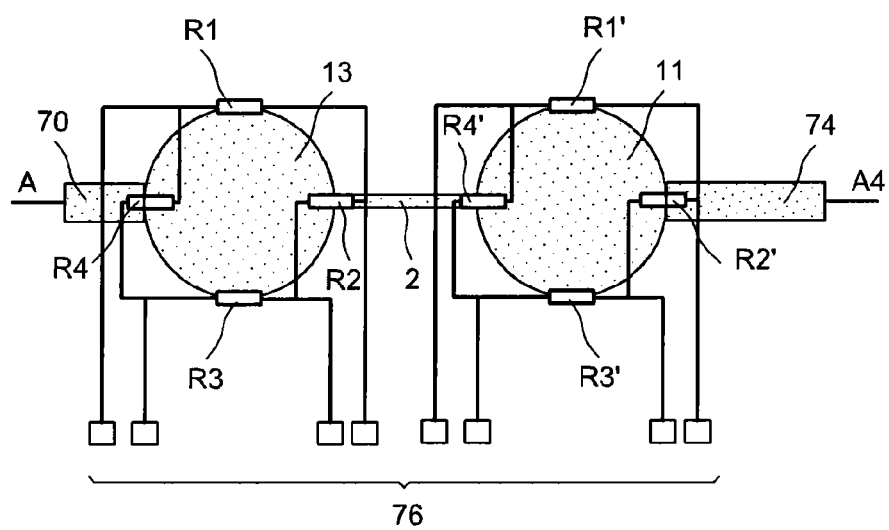
Figure 4B:
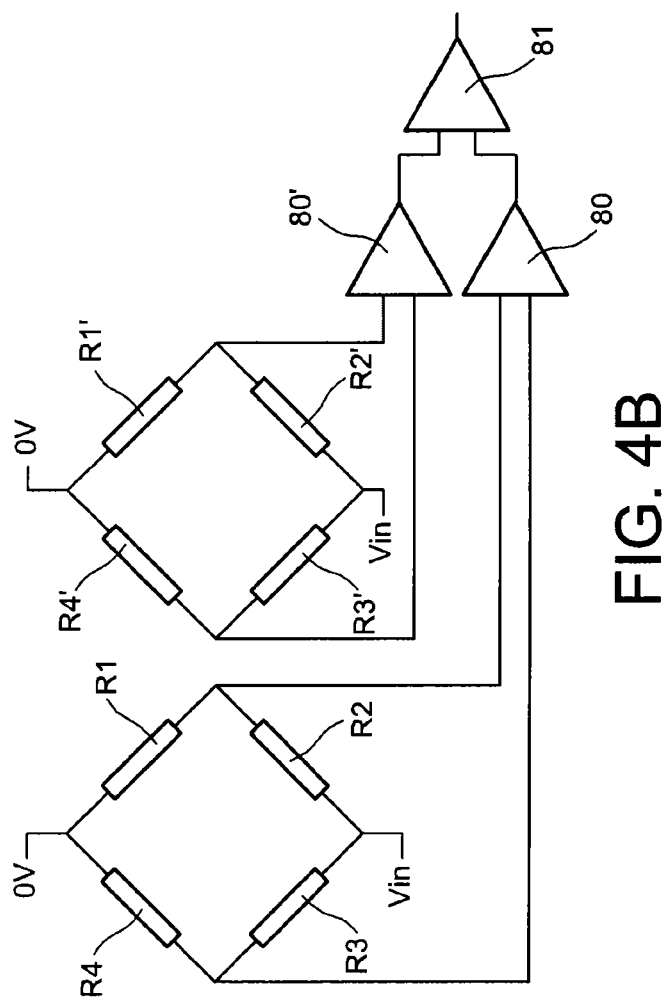
Figure 5:
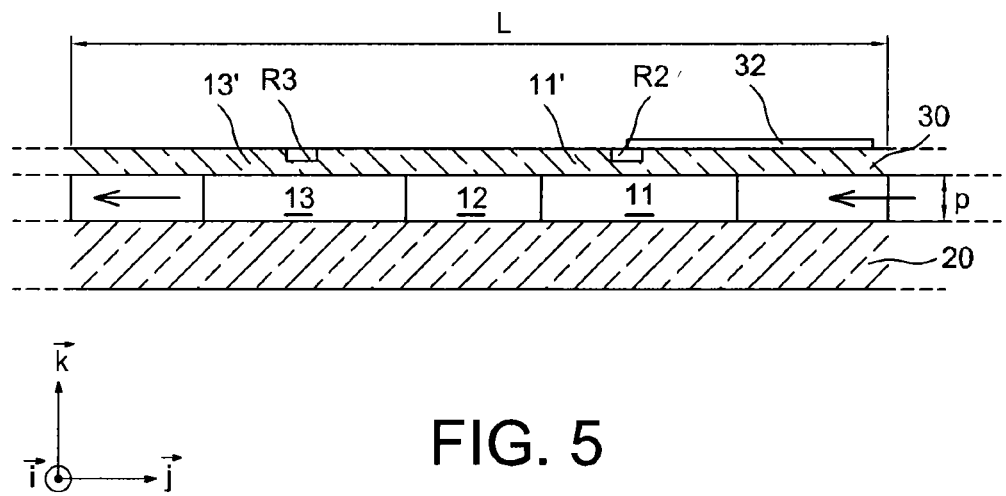
Figure 6:
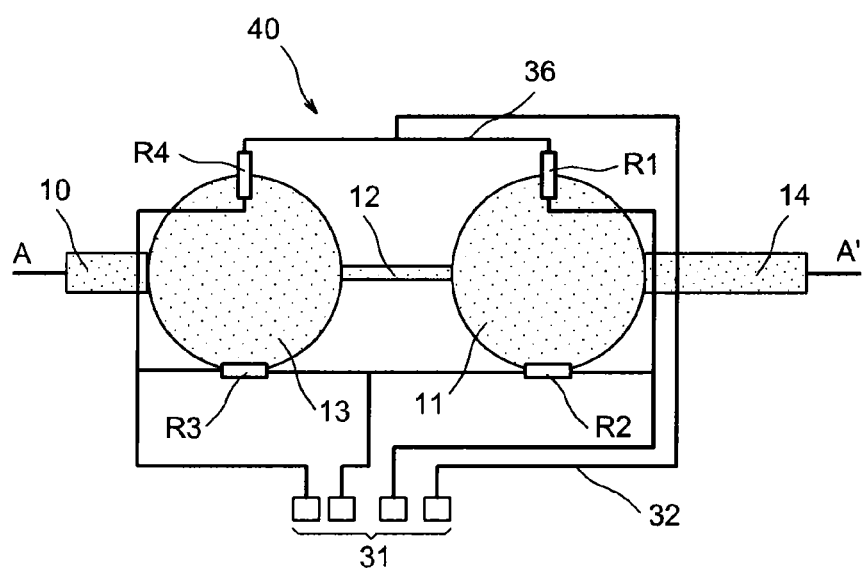
Figure 6B:
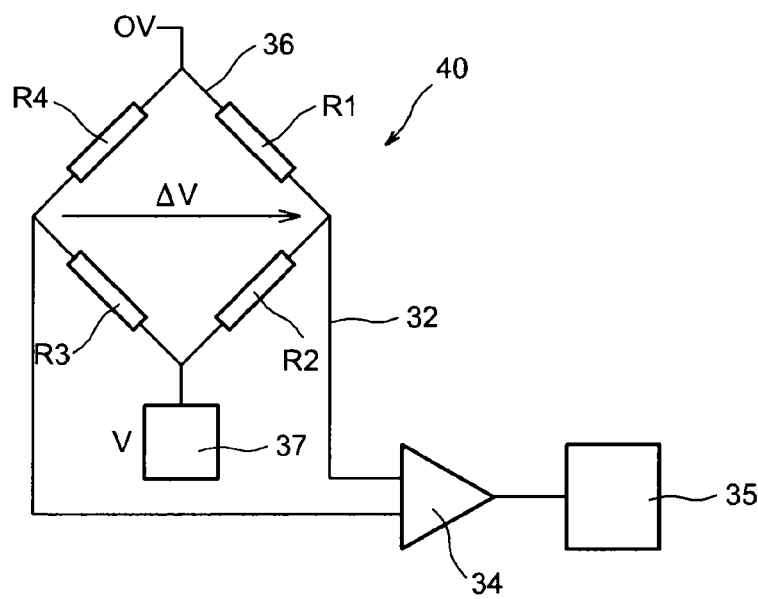
Figure 7:
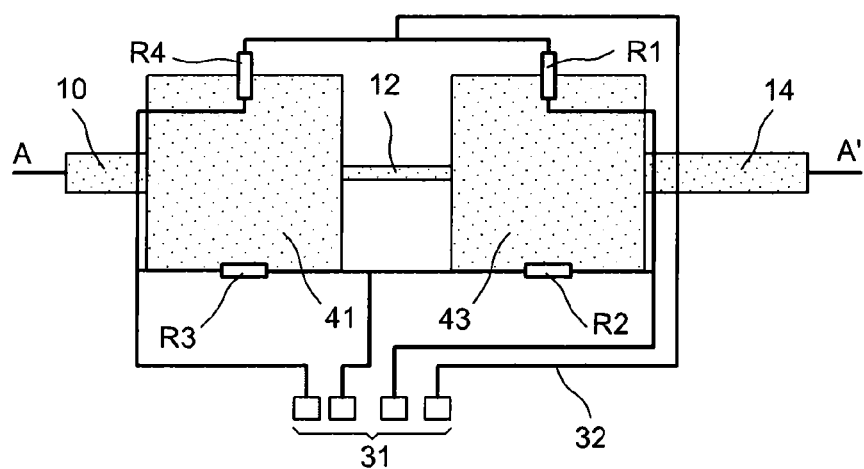
Figure 8:
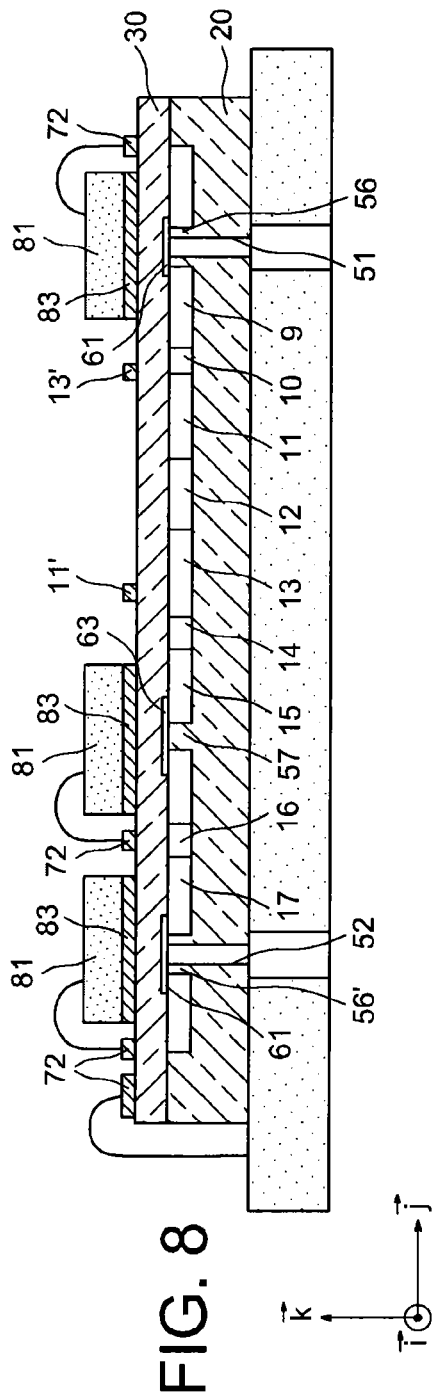
Figure 9:
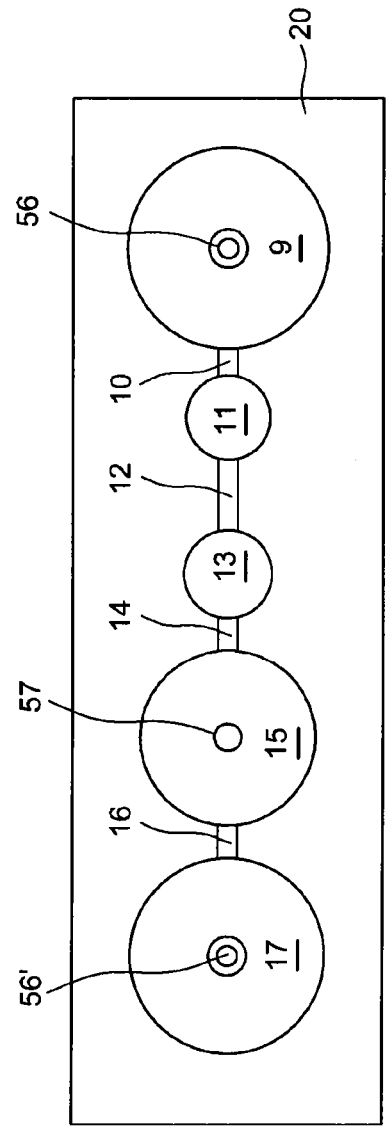
Figure 10A:
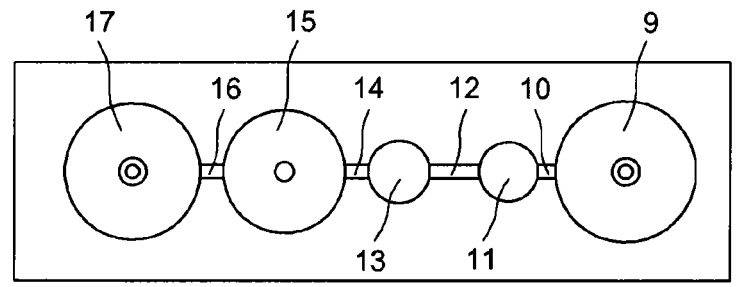
Figure 10B:
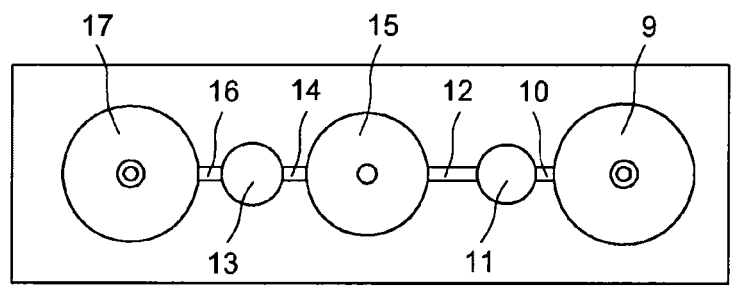
Figure 11A:
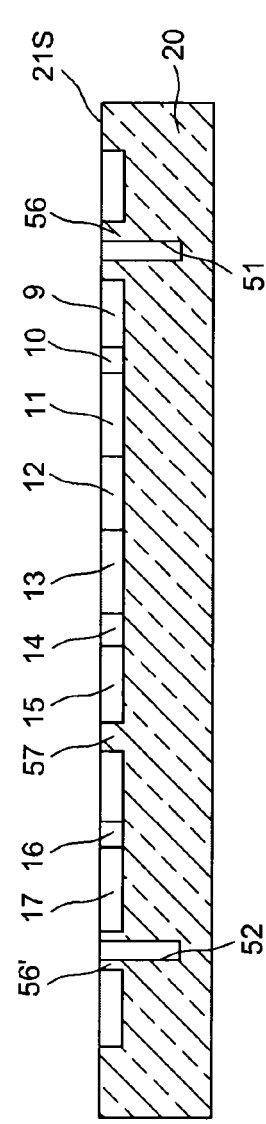
Figure 11B:
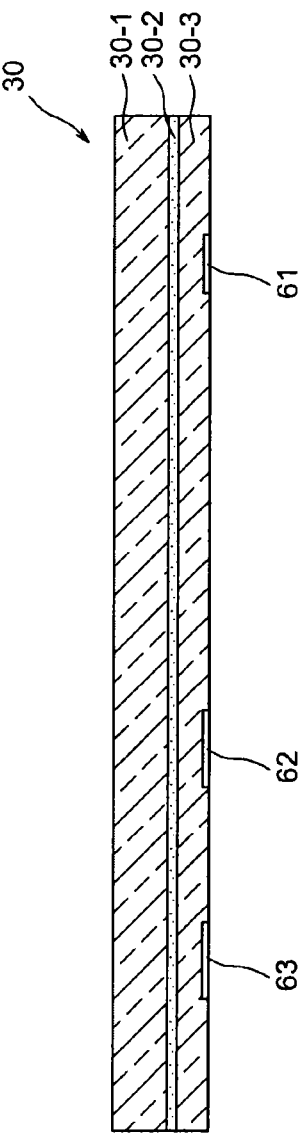
Figure 11C:
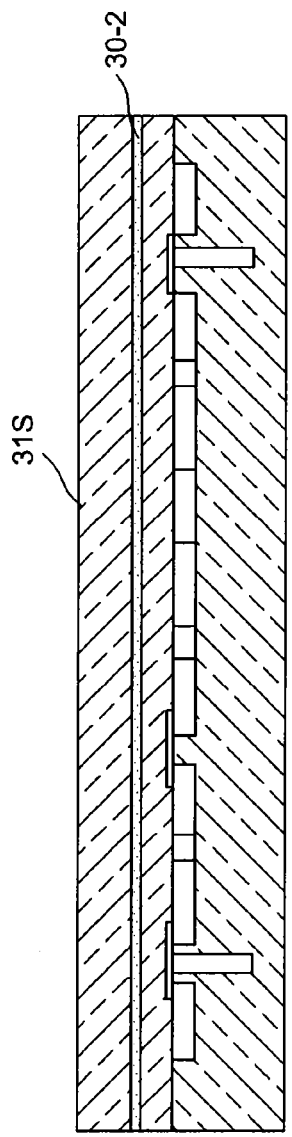
Figure 11D:
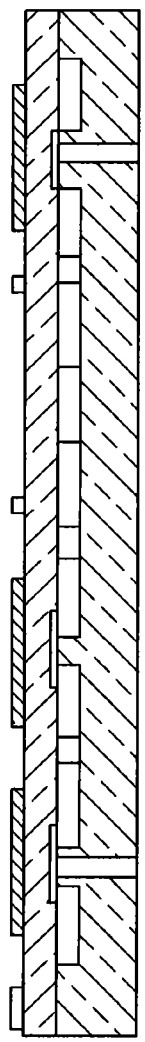
Figure 11E:
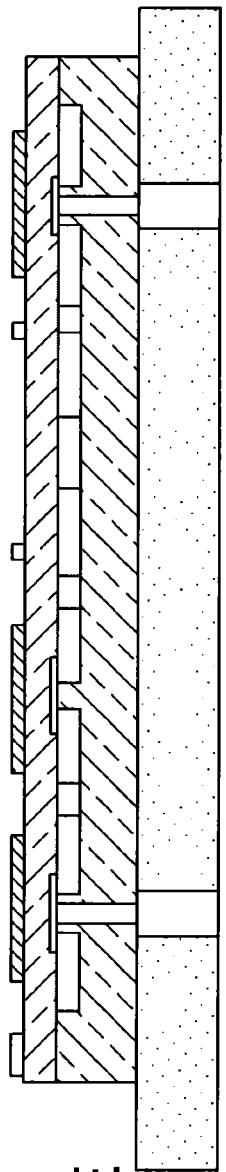
Figure 11F:
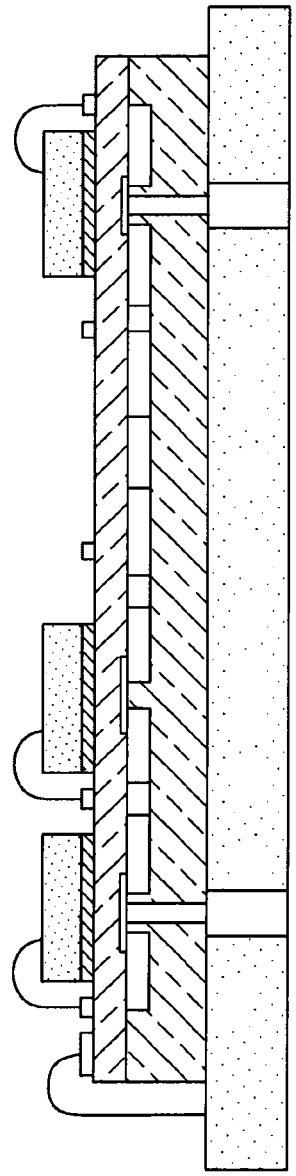
Figure 12:
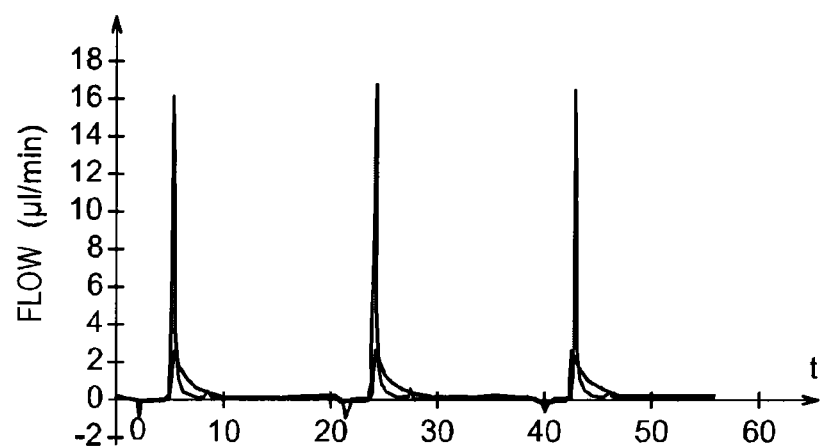
Figure 13:
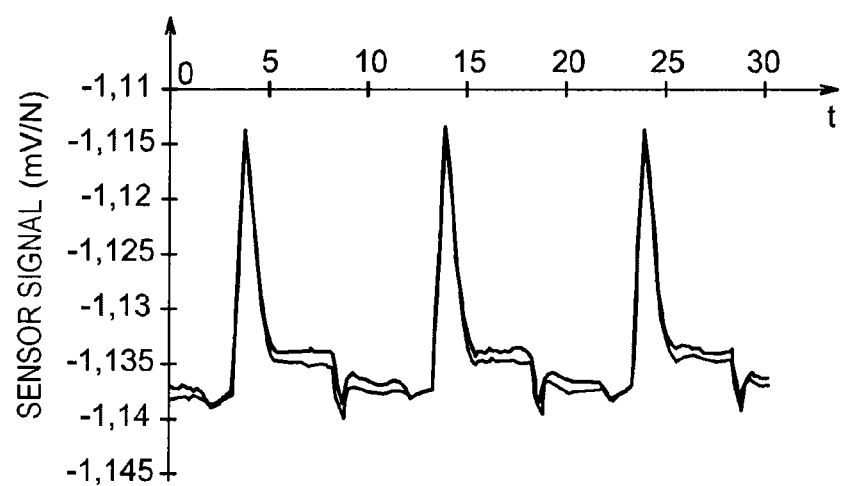

Embodiments of the invention will now be described as non-limiting examples, with reference to the appended drawings, wherein:

FIGS. 1 and 2 already described are a cross-sectional view, of a membrane pump according to an example of the prior art and of a microflowmeter according to an example from the prior art, respectively;

FIG. 3 is a sectional view of the flowmeter portion of a micropump described in the present application;

FIGS. 4A and 4B are schematic views of electric diagrams for mounting sensors associated with a flowmeter, FIG. 5 is a sectional view of the flowmeter portion of a micropump described in the present application, FIGS. 6A, 6B are schematic views of electric diagrams for mounting sensors associated with a flowmeter, FIG. 7 is a top view of the flowmeter portion of a micropump described in the present application, FIG. 8 is a sectional view of a micropump described in the present application, FIG. 9 is a top view of a micropump described in the present application, FIGS. 10A, 10B are top views of micropumps described in the present application, FIGS. 11A-11F schematically illustrate various steps of a method for making a flowmeter described in the present application, FIGS. 12 and 13 are results of measurements of flow rates obtained with a micropump applying an outer flowmeter and with a micropump with an integrated flowmeter, respectively.

DETAILED DISCUSSION OF PARTICULAR EMBODIMENTS

In the following, when one refers to a <<substrate>>, a <<layer>> may also be meant. Therefore, either one of these terms is used equally.

It should be noted that in the drawings, the scales are not observed in order to ensure clarity of the drawings.

In all the description which follows, an orthonormal reference system (i, j, k) is used, as illustrated in FIG. 3.

Moreover, the terms of <<lower>> and <<upper>> used subsequently should be understood here in terms of orientation along the direction k of the orthonormal reference system (i, j, k).

The terms of <<thickness>>, <<height>> and <<depth>> should be understood in terms of a measurement or of a distance along the direction k of the same orthonormal reference system (i, j, k).

The means allowing measurement of a flow rate in a peristaltic micropump are first presented.

A first example of these means is illustrated in FIGS. 3 and 4A-4B. FIG. 3 is a sectional view along a plane, the path of which AA' is seen in FIG. 4A (top view).

Such a device includes 2 membranes 11', 13' positioned facing 2 cavities (or chambers) 11, 13. The latter are connected together through a small channel of small section. This channel will impose a pressure drop to a liquid which flows as indicated by the arrows Fe (inflow) and Fs (outflow) in FIG. 3. It stems from another portion of the device, examples of which will be seen later on, or directed from an external source; it passes into the cavity 11 and then through the restriction or channel 12 and finally the cavity 13 in order to continue as indicated by the arrow Fs, then again towards another portion of the device or towards an outer flow.

The cavities 11, 13 may each have in the ij plane, or plane of the device, a circular shape or a disc shape (clearly illustrated in FIG. 4A), the diameter of which may be of the order of a few millimeters, for example comprised between 1 mm and 10 mm. Alternatively, these cavities may be square or rectangular, this alternative is schematically illustrated in FIG. 7 and will be commented on later.

The chambers having depth p, measured along the direction k, of the order of a few microns to a few hundred microns, for example comprised between 10 μm or 50 μm and 100 μm. Preferably, the depths, measured along the direction k, of the chambers 11, 13 and of the channel 12 are very similar or identical. In order to form a narrower restriction, the depth of the channel 12 may be less than that of the one of the cavities 11, 13. The pressure drop produced by the restriction is all the greater since the restriction is of small section. Thus, the pressure difference of the fluid in the chambers 11 and 13 is all the higher. This increases the accuracy of the measurement of the rate of flow of the fluid between both chambers, as this will be described subsequently. This alternative is schematized in FIG. 3 with a channel 12, the bottom of which is in dashed lines.

The channel 12 may have a width, measured along an axis parallel to the axis i, perpendicular to the direction Fe-Fs of flow of a fluid in the device, of a few tens of microns, for example comprised between 10 μm and 50 μm.

Such a structure may be made in 2 substrates 20, 30 superposed and assembled together.

Each of the substrates has a thickness for example comprised between 100 μm and a few hundred μm, for example between 100 μm and 500 μm.

Each of these substrates extends in the ij plane, perpendicular to the axis k. For this reason, the ij plane is also called the plane of the device or main plane of the device. The axis j is along a direction aligned with the direction of flow of the fluid in the device and the axis i is perpendicular to it. The thickness of each substrate, measured along this axis k, may in certain cases, be very small against the side extensions of the device, i.e. against the dimensions L and l of the device measured in the plane ij; L (measured along the axis j) is for example comprised between a few mm, for example 2 mm or 5 mm, and a few cm, for example 2 cm or 5 cm, and l (measured along the axis i) is for example of the order of 1 cm, for example comprised between a few mm, for example further 2 mm or 5 mm and a few cm, for example further 2 cm or 5 cm.

The substrates 20, 30 may each be in a semiconducting material, for example in silicon, or in another material such as glass, or metal, or polymer, or plastic. Silicon is preferred since it is compatible with collective and accurate manufacturing microtechnologies. Further, this material has good mechanical strength and ageing properties. In the case when the material is silicon, the substrates are connected together for example by molecular assembly, or by adhesive bonding, for example adhesive bonding by screen printing. Molecular sealing has the advantage of not requiring addition of an adhesive.

A pressure drop measurement of a fluid flowing in the cavities 11, 12, 13, as indicated in FIG. 3, is conducted with means for measuring the deformation of the membrane on which or in which these means are formed. In other words, each membrane 11', 13', positioned above a cavity 11, 13, or forming a wall for said cavity, is provided with measurement means, for example at least one gauge, which are formed on or in this membrane 11', 13'. Both membrane portions 11', 13' are preferably identical (same geometry, same size, same stiffness). These membranes are free of means for activating the device like a pump on the other hand: the activation means of the pump are associated with other cavities, as described later on. Thus, the deformations due to the actuation of the means for actuating the pump and the means forming gauges of the cavities 11, 13 are decorrelated, which gives the possibility of avoiding application of a complex signal processing operation and leading to measurement inaccuracies.

In one example, a single gauge is positioned above each cavity 11, 13. Each gauge is then assimilated to a resistor and may be associated with means for measuring its own resistance, which allows measurement or evaluation of the pressure variations in each cavity.

According to a second example, illustrated in FIGS. 4A and 4B, each membrane is provided with a set of four gauges, forming a Wheatstone bridge. In other words, with each of the cavities 11, 13 is associated a set of four resistors R1-R4 and R'1-R'4. The resistors R1-R4 associated with the first cavity 11 are positioned as a Wheatstone bridge. The same applies for the four resistors R'1-R'4 associated with the second cavity 13.

In the example illustrated in FIG. 4A, the four gauges associated with each of the cavities are positioned parallel with each other, and parallel to the direction of flow of the fluid. In FIG. 4B, the means 80, 80', 81 for amplifying and processing the data directly stemming from both bridges are further illustrated.

Regardless of the configuration of the gauges or of the resistors, the electric measurement at the terminals of both Wheatstone bridges allows measurement of the respective pressure in the cavities, 11, 13. The difference of both of these pressure measurements gives the possibility of determining the pressure drop generated by the channel 12.

As this is seen in FIG. 4A, this circuit requires at least 8 connection pads 76.

The electric circuit of this assembly is schematically illustrated in FIG. 4B. The chain for measuring a Wheatstone bridge includes an amplifier 80, 80' and an analog/digital converter. With two bridges, as in FIGS. 4A and 4B, two measurements are amplified their difference is determined. The latter may be calculated after analog conversion but in order to minimize degradation of information, it is preferable to determine the difference before analog conversion. The measurement chain may then include 3 differential amplifiers 80, 80', 81, each having to be powered with powering means.

But this type of circuit may prove to be bulky and involve significant consumption of electricity.

Therefore, there is another possible circuit, as schematized in FIGS. 5 and 6A-6B, including two gauges (R3, R4) on, or in, the first membrane 11' and 2 gauges (R1, R2) on, or in, the second membrane 13'. This configuration gives the possibility, when a pressure difference exists between both membranes, of having an optimum sensitivity value relatively to the respective variations of the value of the 4 resistors forming the bridge.

Moreover, with two Wheatstone bridges (case of FIGS. 4A and 4B), the measurement is conducted at two different instants, unless the whole measurement chain is duplicated and the measurement of the difference of the two bridges is simultaneously made, which is difficult to achieve. With a single bridge to be measured (case of FIGS. 6A and 6B), there is no synchronization problem and an instantaneous flow rate may be measured with better accuracy. In particular, a peristaltic pump generally generates flows in the form of very short pulses and it is advantageous to have a good definition of the maximum intensity and of the time width of the pulses.

Preferably, the orientation of the 4 strain gauges is such that the measurement of the flow rate is more sensitive. For example, if the membranes 11', 13' each have a circular shape, illustrated in FIG. 6A, one of the gauges of each membrane is placed on a radial direction of the latter (R4 or R1 in the figure), while the second one (R2 or R3) is placed along an angular direction, or is placed so as to form (the indicated relative orientations should be considered as a projection on a plane defined by the pair of vectors (i, j), or on a plane parallel to the main plane of the device), an angle, here substantially similar to a right angle, with the radius of the circle formed by the membrane, in the location where this gauge is positioned. A gauge of a membrane is positioned in the direction of flow of a fluid, while the other gauge of the same membrane is substantially perpendicular to it.

FIG. 7 (case of square-shaped cavities) reproduces the same arrangement, with a gauge of a membrane positioned in the direction of flow of the fluid, while the other one is substantially perpendicular to it.

In the case of FIGS. 6A and 6B, each of the gauges is preferably localized in the vicinity of the edge or of the anchoring (in the substrate in which it is made) of the corresponding membrane, there where the stress is maximum (there again, as a projection in a plane (i, j) or in a plane parallel to the main plane of the device).

As this is seen in FIGS. 6A and 6B, the gauges R1-R4 are connected together through electric lines 36, so that the whole forms a Wheatstone bridge. The apices of the bridge are connected to contact pads 31, which allows connection of the flowmeter to an electronic measurement system 34, 35, including an amplifier 34.

In the various cases discussed above, the output of the system (for example the output of the amplifier 80 for FIG. 4B, or the output of the means 35 for FIG. 6B) may be connected to memory storage and/or data processing means (and notably the variations of the resistors of the gauges), for example means of the micro-processor type, further for example computer means. These means allow calculation of the variation of the flow rate. A viewing screen (not shown in the figures) allows an operator to view the time-dependent change in the flow rate data during the flow of a fluid.

Relatively to a structure such as the one of FIGS. 4A and 4B, a measurement device of the type of FIGS. 6A and 6B gives the possibility of reducing the number of electric connections between the sensor and its associated electronics (4 connections 31 instead of 8 connections 76, each connection corresponding to an apex of a bridge).

Another advantage of this structure of FIGS. 6A and 6B is the reduction of the energy consumed by the measurement. Indeed, each bridge is electrically powered and the fact of passing from 2 bridges (each bridge associated with a chamber) to 1 single bridge gives the possibility of dividing by two the energy consumption required for the measurement.

The cabling of the gauges of such a device is also itself much simpler than the one of FIGS. 4A and 4B, which simplifies the measurement chain. Further, a single amplifier 34 (FIG. 6B) is required. This represents a gain in space and minimization of electric consumption: in a configuration with two bridges, therefore with 3 amplifiers 80, 80', 81, each amplifier has to be powered. Moreover the fact of conducting a differential measurement before the measurement chain gives the possibility of reducing the risk of information degradation and therefore of minimizing the measurement uncertainty related to the electronics of the flowmeter.

These different advantages are particularly sought for medical (implantable) applications where it is essential to reduce the size of the electronics, to simplify the information processing and to reduce the electric consumption, while keeping an optimum sensitivity level. Moreover, for flows with rapid transients (for example a pump with a membrane and valve generates flow rate pulses), the calculation of the difference of the measurements on two Wheatstone bridges may involve a complex simple processing operation in order not to lose sensitivity, this problem is no longer posed with a measurement of flow in a single Wheatstone bridge, as in FIGS. 6A and 6B.

An alternative is illustrated in FIG. 7, wherein the cavities 41, 43 have a substantially square or rectangular shape in the plane of the device, each side of which is for example of the order of a few millimeters, for example comprised between 1 mm and 10 mm. The other references on this figure designate identical or similar elements to those which have already been described above with the other figures. A sectional view, along the axes AA', is identical with the one of FIG. 5, and the electric diagram of the measurement bridge circuit is identical with the one described above in connection with FIG. 6B.

The other considerations above, relating to the dimensions of the various device elements, to the materials which may be applied, and to the means for measuring data, apply to this alternative.

In the various cases shown above, each gauge is preferably in a conducting material or in a doped semiconducting material. It is for example in gold, or in aluminum or in titanium, or in platinum, or in an alloy (for example AlSi). Preferably, a conducting material is selected having a high gauge factor, for example platinum. Alternatively, gauges are made in a doped semiconducting material such as for example p-doped silicon obtained by implantation of boron ions. A sensor made by means of gauges in a semiconducting material (for example boron-doped silicon with a dosage of a few $10^{19}$ at·cm$^{-3}$) provides a 50 to 100 times greater sensitivity than a sensor using metal gauges.

Each of the gauges may have an elongated shape, with a width of a few microns, which may be comprised between 1 µm and 9 µm or 10 µm, and a length of a few tens of microns, which may be comprised between 10 µm and 100 µm.

In the case of FIGS. 3-6B, the 4 resistances R1, R2, R3 and R4 are preferably identical rated values R0 (i.e. without any deformation).

If the material of the substrates in which the device is made is silicon, the strain gauges are preferably oriented along the <010> directions of the crystalline silicon lattice. This gives the possibility of maximizing the piezo-resistive effect: the gauges are then more sensitive. Other sensors of deformations may be present on the membranes 11', 13', for example in order to measure the pressure in either one of the membranes.

When a fluid flows in the whole of the network formed by the first chamber 11, the channel 12, the second chamber 13, the pressure drop generated by the restriction 12 induces a pressure difference between the cavities 11 and 13.

If Pa and Pb designate the respective pressures in the chambers 11 and 13, the pressure drop generated in the restriction 12 is preferably greater than the pressure drop generated in the other channels or in the chambers.

As an example, it is recalled that for a channel with a square cross-section with side d, and length L, the pressure drop is written as:

$$\Delta P = 28.4 \frac{\mu L}{d^2} \langle Q \rangle$$

wherein µ is the viscosity of the liquid and Q is the rate of flow. In order to simplify, the following relationship will be used:

$$Pa-Pb=\alpha Q, \qquad \text{(eq. 1)}$$

wherein Q designates the flow rate in the flowmeter and α is a coefficient depending on the geometry of the restriction 12 and on the viscosity of the fluid. This formula is therefore applicable for any geometry of the cross-section of the channel along the j axis (or in the ik plane).

Under the action of pressure, the membranes 11', 13' facing each cavity 11, 13 deform. The material forming the membranes having a substantially elastic behavior, a linear relationship is obtained to the first order between the pressure and the deformation of the membranes, and therefore a linear relationship between the relative variation of the resistance of each gauge and the pressure in the corresponding cavity.

Let K be this proportionality relationship $$\left( \frac{\Delta R}{R} = KP \right).$$

The value of K depends on the stiffness of the membranes, on the position of the gauge, and on the piezo-resistive properties of the gauge. The coefficient K also depends on the orientation of the gauge. If two gauges are positioned according to the orientations of FIGS. 6A and 6B, therefore axially and angularly, they will have coefficients K with opposite signs. Thus, for the resistances of the first membrane 11' of FIG. 6A, subject to a pressure Pa, one has:

$$R4=R0(1-KPa)$$

$$R3=R0(1+KPa)$$

Also, for the second membrane 13' of FIG. 6B, subject to a pressure Pb, one has:

$$R1=R0(1-KPb)$$

$$R2=R0(1+KPb)$$

The bridge is powered by means 37 supplying a voltage V. The imbalance, i.e. the potential difference ΔV of the Wheatstone bridge is given by the relationship:

$$\frac{\Delta V}{V} = \frac{R_1 R_3 - R_2 R_4}{(R_1 + R_2)(R_3 + R_4)}$$

(the sign depending on the convention of the signs of the voltages).

As the resistance variations are much smaller than the rated value of the gauges (ΔR<<R0) the following equation (2) is obtained:

$$\frac{\Delta V}{V} = \frac{K}{2}(Pa - Pb)$$

By combining the equations (1) and (2), one finds:

$$\frac{\Delta V}{V} = \frac{K}{2} \alpha Q$$

This last equation shows that the Wheatstone bridge configuration described above gives the possibility of giving a direct relationship between the flow rate Q and the potential difference ΔV measured on the terminals of the Wheatstone bridge.

For the other orientations relative to the gauges, these formulae will be adapted.

As already explained above, in a general way, notably in the configurations of FIGS. 6A and 6B, with 2 gauges per membrane and per cavity, all the 4 of them forming a Wheatstone bridge, it is preferable that the resistors be not all parallel with each other, and/or that the resistors positioned on a same membrane not be parallel with each other, and/or that the Wheatstone bridge formed by the 4 resistors include two successive resistors parallel relatively to each other.

In a general way, it is preferable that the resistors be not all parallel with each other.

Further, it is preferable that the resistors positioned on a same membrane be not parallel with each other. Advantageously they should be perpendicular relatively to each other. For example, a membrane may include a resistor oriented radially, the other resistor being oriented tangentially.

Another preferential condition is that the Wheatstone bridge formed by the four resistors should include two successive resistors parallel with each other.

In the configuration illustrated in FIG. 4A, the first Wheatstone bridge R1, R2, R3 and R4 allows measurement of the pressure at the membrane 13, according to $$\frac{\Delta R}{R} = KP.$$

In the same way, the second Wheatstone bridge R'1, R'2, R'3 and R'4 allows measurement of the pressure at the second membrane 11. The flow rate is then estimated according to the relationship of equation 1.

The other aspects of a pump including these flow measurement means are explained now.

As this is seen in FIG. 8, a plurality of cavities (or chambers) 9, 11, 13, 15, 17 are made in the upper face of a first substrate 20, as well as communication conduits 10, 12, 14, 16.

By cavity, is meant a recess or a notch made in the surface of a solid.

It may be noted that it is possible to have an embodiment with only 3 chambers, one for the pumping and two for measuring the flow rate, in other words, the configuration of FIG. 8 without the chambers 9 and 17; in this case, an anti-return valve is added at the inlet conduit and preferably an anti-return valve at the inlet and at the outlet.

In the example of FIG. 8, the device includes 5 cavities:
a cavity 15, a so-called central cavity,
two upstream 9 and downstream 17 cavities,
two cavities 11, 13, communicating through a conduit 12, this assembly having the structure already described above in connection with FIGS. 3 and 5.

The cavities 15, 9, 17 may have, as a projection in an (i, j) plane or in the main plane of the device, the shape of a disc, of a ring, of a polygon or any other shape of the same type, from a few millimeters in diameter or diagonal, for example 3 mm or 6 mm, and a depth of the order of a few microns to a few hundred microns, for example comprised between 1 μm or 5 μm and 50 μm or 100 μm or 500 μm.

Indeed, it is possible to define a compression rate, corresponding to the ratio between the volume of fluid displaced by the membrane and the volume of the cavity located facing the membrane. It is preferable that this compression rate be as large as possible. Also, the depth of a cavity is preferably less than or equal to 100 μm.

The channel 12 has a width (measured perpendicularly to the flow direction of the fluids, along the j axis) of a few tens of microns (typically 50 μm or comprised between 10 μm and 100 μm), while the other communication channels 10, 14, 16 preferably have a larger width (a few hundred microns, for example comprised between 50 μm and 500 μm). The depth of the channels 10 and 12 is preferably identical with the depth of the cavities, 9, 11, 13, 15, 17.

Inlet 51 and outlet 52 conduits are made in the form of wells respectively opening into the inside of the upstream 9 and downstream 17 cavities respectively. They may have a diameter of the order of a few hundred microns, for example comprised between 100 μm and 600 μm or 900 μm, and a depth of the order of a few hundred microns, for example comprised between 100 μm or 300 μm and 600 μm or 900 μm.

The inlet 51 and outlet 52 conduits open into said cavities through an orifice edged with an annular lip 56, 56'. The lips may have a height substantially equal to the depth of the cavities in which they are located.

Clearances 61, 62 are made in the lower face of the second substrate 30; they will face the corresponding lips 56, 56'. They may be annular or have a disc shape and have small depth, of the order of a few microns, for example 2 μm, or of a few tenths of micron, for example 0.1 μm.

By clearance is meant a recess or a notch with small depth, typically comprised between 0.1 μm and 3 μm, facing that of the cavities, of the order of a few tens of microns, for example 50 or 100 μm. Thus, the lower face 311 of the second substrate 30 may be considered as substantially planar. The term of <<substantially>> describes herein the thickness variations of this substrate not exceeding a few microns, for example 3 μm.

These clearances 61, 62 give the possibility of guaranteeing, during the subsequent step for assembling the substrates, that the apex of the lips 56, 56' does not touch the lower face of the second substrate 30. Further, these clearances will ensure fluidic communication, in the case of a mechanically non-stressed membrane, between the inlet 51 and the outlet 52 conduits and the cavities 9, 17 into which they open.

Moreover, a boss 57 may be made in the upper face of the first substrate 20 and substantially localized in the center of the central cavity 31. In order to avoid contact between the lower face of the second substrate 30 and the apex of the boss 57, a clearance 63 is advantageously made in the lower face.

Alternatively, it is possible that there are no clearances in the lower face of the second substrate 30, which then remains planar. The height of the lips 56, 56' is then less than the depth of the upstream 9 and downstream 17 cavities in which they are located. Thus, the apex of the lips 56, 56' does not touch the lower face of the second substrate. Further, fluidic communication is also ensured, in the case of a mechanically non-stressed membrane between the inlet 51 and outlet 52 conduits and the cavities 9, 17 into which they open. In the same way, it is possible that the boss 57 has a height less than the depth of the central cavity 15 in which it is located.

Preferably, the first and second substrates 20, 30 are in silicon, and are assembled by molecular sealing. This type of sealing is particularly suitable for assemblies of the Si—Si or Si-glass type. This technique is also called sealing by melting, or direct sealing.

The second substrate 30 has a substantially planar upper face and its thickness is substantially homogeneous. The term of <<substantially>> covers the possible variations in thickness of the order of 0.1 µm to 3 µm resulting from the clearances 61-63 made in the lower face of the second substrate 30.

The actuation means of the membranes may include piezoelectric means, for example in the form of platelets 81, positioned on the upper face of the second substrate 30, and positioned on the deformable membranes of the cavities 9, 15, 17. They each lie on a conducting disc 83 and are assembled to the latter by means of a conducting adhesive. The thickness of the piezoelectric platelets may be of the order of about 100 microns, for example about 125 µm to 200 µm. A presentation of the piezoelectric materials which may be used, may be found in the article of Doll et al. entitled <<*A novel artificial sphincter prothesis driven by a four-membrane silicon micropump*>>, Sensor. Actuat. A-Phys., 2007, Vol. 139, 203-209.

Alternatively, the discs may be obtained after chemical vapor deposition (CVD) of the sol-gel type. In this case, the thickness of the discs may have a thickness of less than 1 µm or a few microns.

Contact pads 72 give the possibility of ensuring electric powering of the micropump with the external system. The conducting discs 83 have a diameter substantially equal to that of the piezoelectric platelets. This diameter may be of the order of 0.5 to 0.85 times the diameter of the cavities facing which the discs are positioned.

Finally, an electric wire 84 is welded to the upper face of the piezoelectric platelets and connected to the conducting tracks. Thus, an electric voltage may be applied, independently, to each piezoelectric platelet. The deformation of a piezoelectric platelet then causes deformation of the corresponding deformable membrane. The piezoelectric platelets may therefore be used as a means for actuating the membranes in order to deform the latter. It should be noted that they may also be used as a sensor for measuring movement of the membranes, or their position induced by the deformation.

Moreover, the cavities 11, 13 are each surmounted with a membrane portion, formed by a portion of the upper substrate 30, and, on this portion, lies at least one gauge 11', 13' as explained above in connection with FIGS. 3-7. There may be several gauges, for example 4 gauges for each of the cavities 11, 13 as explained above in connection with FIGS. 3-4B or 2 gauges for each of these cavities, as explained above in connection with FIGS. 5-6B.

The connections to these gauges are also made at the surface of the substrate 30.

This type of system is illustrated in FIG. 9 in a top view. References identical with those of the previous figures designate same elements therein.

The different cavities, the communication conduits, the lips 56, 56' and the boss 57 are seen therein.

FIG. 10A is a schematic top view of the same system, wherein only the position of the different cavities and communication conduits are illustrated. It is seen that both cavities 11, 13 of the flowmeter are positioned between the inlet valve 9 and the main membrane 15 for pumping. Symmetrically, not shown, they may be positioned between the outlet valve 17 and the main pumping membrane 15.

FIG. 10B represents an alternative, wherein both cavities, 11, 13 of the flowmeter are positioned on either side of the main pumping membrane 15, and the pressure drop is formed by the channels 12, 14 and the main chamber 15, the pressure drop generated by the chamber 15 being negligible with respect to the one formed by the channels 12 and 14. For this alternative, the lips, the boss, the upper substrate, the gauges, the activators of the membranes are identical with those described above in connection with FIGS. 3-9, except for the positions of the two chambers and also of the gauges.

FIGS. 11A to 11E illustrate as a cross-sectional view, a micropump with a deformable membrane, for different steps of a manufacturing method.

The details, dimensions, constitutive materials of the structure made have been given above.

A first substrate 20 (FIG. 11A) formed for example from a polished silicon wafer with two faces is considered.

A second substrate 30 (FIG. 11B) for example formed from a silicon-on-insulator wafer (SOI for Silicon On Insulator) is considered. A $SiO_2$ layer 30-2 is thus present between two upper 30-1 and lower 30-3 silicon layers.

The thickness of the first and second substrates is of the order of a few hundreds of microns, for example comprised between 100 µm and 700 µm.

The size of the first and second substrates may be of the order of a few millimeters to a few centimeters. Each substrate may for example form, in the ij plane, a rectangle of 1 cm×3 cm.

The thickness of the lower layer 30-3 of silicon of the second substrate 30 is substantially equal to the thickness of the deformable membranes which will subsequently be made with view to making up the deformable portion of each of the cavities. This thickness may thus be of the order of a few tens to a few hundred microns, for example 10 µm to 300 µm, and preferably 50 µm. As this will be detailed later on, the lower layer 30-3 of the second substrate gives the possibility of accurately defining the thickness of the deformable membranes which will be made.

According to a first step, a plurality of cavities 9, 11, 13, 15, 17 is made in the upper face 21S of the first substrate 20, as well as communication conduits 10, 14, 16 and the restriction 12. The lips 56, 56' and the boss 57 are also formed.

By cavity, is meant a recess or a notch made in the surface of a solid.

In the illustrated example, 5 cavities are thus obtained, a central cavity 15, two upstream 9 and downstream 17 cavities, and two cavities 11 and 13 which are connected in series with the remainder of the device via communication conduits 10, 14. The central cavity 15 forms the pumping chamber, both upstream 9 and downstream 17 cavities form anti-return valves and the cavities 11, 13 and the channel 12 will allow measurements of flow rates.

The inlet 51 and outlet 52 conduits are made as wells respectively opening inside the upstream and downstream 17 cavities respectively, but, preferably not yet as through-cavities relatively to the first substrate 20. They may be located in the center of said cavities.

The inlet 51 and outlet 52 conduits open into said cavities through the annular lip 56, 56'. These lips may have a height substantially equal to the depth of the cavities in which they are located.

Moreover, in this case, the clearances 61, 62, 63 are formed in the lower face 311 of the second substrate 30, intended to face the corresponding lips, 56, 56'.

The making of these various elements may apply conventional micro-electronics techniques for example photolithography followed by etching steps. The etching may be achieved with a plasma, of the RIE (Rayonic Ion Etching)

type, which gives the possibility of obtaining vertical walls. By <<vertical>>, is meant oriented along the vector k of the reference system (i, j, k).

Alternatives have been explained, relating to the absence of clearances in the lower face 311 of the second substrate 30, and to adaptation of the corresponding height of the lips 56, 56'. Thus, during the subsequent step for assembling the substrates, the apex of the lips 16 does not touch the lower face 311 of the second substrate. In the same way, it is possible to make a boss 57, the height of which is less than the depth of the cavity 15 in which it is located. The steps for making these elements are adapted depending on the desired dimensions. For example, for an etching technique, the shapes of masks and/or the etching times are adapted.

Said substrates are then assembled to each other.

If the first and second substrates 20, 30 are in silicon and in SOI respectively, it is possible to carry out assembling by molecular sealing. This technique is also called sealing by melting, or direct sealing of silicon.

This assembling step by molecular sealing includes a first phase for preparing the faces of a substrate 20, 30 intended to be assembled, more specifically a cleaning and hydration phase.

The substrates 20, 30 are thus cleaned with a wet treatment such as RCA cleaning, notably described in the textbook mentioned earlier of Maluf and Williams entitled <<*An introduction to microelectromechanical systems engineering*>>. This cleaning technique gives the possibility of obtaining clean and non-contaminated surfaces, having a strong density of OH groups.

As shown in FIG. 11C, the substrates are then aligned and put into contact with each other.

Sealing annealing is finally carried out at a high temperature for a determined time. The temperature may be comprised between 500° C. and 1,250° C., for example of the order of 1,000° C. and the annealing time may be of the order of one hour. The thereby obtained assembly of the substrate is then solid and long-lasting.

It is understood that during the assembling step, the second substrate 30 has not yet been subject to the step for making a deformable membrane. The thickness of the second substrate 30 is therefore substantially identical with its initial thickness, i.e. a few hundred microns. The clearances possibly made 61, 62, 63 in the lower face 311 have negligible depth relatively to the total thickness of the second substrate 30, and therefore do not modify the overall stiffness of the substrate 30. Also, the handling of the second substrate 30 before and during the assembling step has low degradation risks by breaking or tearing.

Moreover, in spite of the high applied temperature during the sealing annealing, the first and second substrates 20, 30 have sufficient thickness making any thermal deformation negligible on their part. The spacing between the apex of the lips of the first substrate 20 and the lower face 311 of the second substrate 30 may thus be very small, for example of the order of one micron or a tenth of a micron, for example further as mentioned earlier. Therefore there is no risk that following thermal deformation of either one of the substrates, the lips 56, 56' and the lower face 311 of the second substrate 30 be put in mutual contact so that sealing of these surfaces occurs. For the same reason, the spacing between the apex of the boss 17 and the lower face 311 may also be of the order of one micron or a tenth of a micron.

Finally, it should be noted that, during this assembling step, the inlet 51 and outlet 52 conduits may not be through-conduits, as shown by FIGS. 11C and 11D. In this case, the assembling step is advantageously carried out in vacuo. The ambient pressure may be comprised for example between a few $10^{-4}$ mbars and a few $10^{-2}$ mbars. This gives the possibility of avoiding that, by thermal expansion of gases confined in the closed volume formed by the cavities 9, 11, 13, 15, 17 and the conduits 12, 14, 16, significant overpressures generate excessive mechanical stresses inside said substrates, but also in the assembly area between both substrates.

The deformable membranes are then made in the second substrate.

As shown by FIG. 11D, this embodiment may be carried out by thinning the second substrate 30 over the whole of its surface, from its upper face 31S.

A first mechanical polishing phase of the grinding type may be carried out. This technique is notably described in the article of Pei et al. entitled <<*Grinding of silicon wafers: A review from historical perspectives*>>, Int. J. Mach. Tool. Manu., 48 (2008), 1297-1307.

The polishing may be stopped at a few microns or tens of microns above the intermediate $SiO_2$ layer 30-2.

The thinning down to the intermediate layer 30-2 may be obtained by the known technique of mechano-chemical polishing of the CMP (Chemical Mechanical Polishing) type. Alternatively, and in combination with this technique, dry etching of the RIE type and/or wet etching by means of a KOH or TMAH (tetramethylammonium hydroxide) bath may be carried out. In the case of dry or wet etching, the $SiO_2$ layer has the advantage of being used as a stopping layer, which gives the possibility of accurately controlling the final thickness of the membrane to be formed.

Finally, the intermediate $SiO_2$ layer 30-2 of the second substrate 30 may be etched with dry etching of the RIE type or by chemical etching with hydrofluoric acid (HF).

As illustrated by FIG. 11E, the second substrate 30 then has a substantially planar upper face 31S and essentially comprises the lower layer 30-3 of the initial SOI.

The second substrate 30 does not have any geometrically defined areas intended for forming deformable membranes. Because of its thickness, of the order of a few tens to a few hundred microns, for example 10 µm to 300 µm, and preferably 50 µm, any area of the second substrate may form a deformable membrane. Nevertheless, the areas of the second substrate 30 located facing the cavities 9, 15, 17 are intended to form deformable membranes for the pump and the areas facing the cavities 11, 13 are intended to form deformable membranes for the sensor.

It should be noted that the thinning step may be performed at atmospheric pressure, while the cavities still form a closed volume in vacuo. A pressure force is then applied on the upper face 31S of the second substrate 30, which tends to cause flexure of the latter inside the cavities. Advantageously, the boss 57 positioned in the central cavity 15 forms an abutment for the second substrate 30 and thus imposes a limit to the flexural deflection of the latter. The lips 56, 56' located in the upstream 9 and downstream 17 cavities may also form an abutment for the second substrate 30 and also contribute to limiting the maximum possible flexure of the second substrate.

Because of the flatness of the upper face 31S of the second substrate 30, it is possible to perform on this face the conventional micro-manufacturing steps such as the deposition, photolithography steps by deposition of photo-resist with a spinner, and then with etching. These steps notably give the possibility of forming the means for detecting the deformation of the membranes used for the gauges of the flowmeter. These means may include a plurality of strain gauges, for example positioned on or in at least one portion of the deformable membrane facing the cavities 11, 13 and, for example electrically connected together by forming one or two Wheatstone bridges. These strain gauges may be of the piezo-resistive or piezoelectric type.

As shown by FIG. 11E, the detection means may be made by a conducting level made on the upper face 31S of the second substrate 30. This conducting level is made by depositing a metal layer, for example of one of the materials already presented above. This conducting level gives the possibility of biasing the piezoelectric platelets and of electrically connecting them. Thus connections of the gauges towards the means 35 or 80 or 80' are also made.

Alternatively, the strain gauges may be made in a doped semiconducting material such as for example p-doped silicon obtained by implanting boron ions. The advantages of this alternative have already been discussed above.

The gauges are directly made in the silicon of membranes. It is also possible to produce the gauges by depositing a layer of polysilicon at the surface of the membranes. Such a technique is presented in the article of Malhaire and Barbier entitled <<*Design of a polysilicon-on-insulator pressure sensor with original polysilicon layout for harsh environment*>>, 2003, Thin Solid Films, 427, 362-366. The manufacturing of piezoelectric sensors in doped silicon is also described in document WO201092092A1.

The sensors may include strain gauges made on the membrane, as in the example of FIG. 8.

Alternatively, the sensors may include strain gauges made in the membrane, like in the examples of FIGS. 3 and 5. In this case, interconnections made on the membrane electrically connect the strain gauges to the data processing means. An electrically insulating layer (not shown) for example based on a dielectric such as $SiO_2$ may be positioned on the substrate, thus covering the strain gauges and the interconnections.

Other deformation sensors may be added on the other membranes in order to measure their deformation under the action of the actuators, or under the action of the pressure in the pump.

Preferably, at this stage, the inlet 51 and outlet 52 conduits are not yet through-conduits. An etching step is therefore carried out on the lower face 211 of the first substrate 20 in order to make these conduits, through-conduits. The assembly is then open and communicates with the external environment.

This step is advantageously carried out at the end of the manufacturing method. This gives the possibility of avoiding contamination of the inside of the microchannel of the micropump with any kinds of residues or impurities. The risk of clogging or poor operation of the upstream and downstream valves is thus suppressed.

Finally, in the case when a plurality of micropumps is simultaneously manufactured from one wafer forming the first substrate and from a second wafer forming the second substrate, the wafers are cut out in order to individualize the thereby manufactured pumps.

Results are now shown explaining the benefit of a device as described above, with a flowmeter integrated with a micropump.

In the tests which were conducted, the flow generated by a membrane pump, of the type described above in connection with FIGS. 8, 9 and 6A, is measured by the integrated flowmeter. The results are compared with a second commercial sensor (or external flowmeter, (Sensirion SLG1430-480, Switzerland), placed after the pump and connected to the latter through a tube. This tube is first a flexible tube, in a first material (Tygon®), and then in a second phase, is replaced with a rigid tube, in a first material (Teflon®) with a diameter and length identical with those of the first tube.

For both of these experiments, the conducted measurements are transferred:

to FIG. 12 for the flowmeter outside the pump;
to FIG. 13 for the integrated flowmeter.

The curves show the time-dependent change of the signal of the flowmeter during several pumping cycles. The fluctuations are due to the operating principle of a peristaltic membrane pump.

In the case of FIG. 12 (external flowmeter) both measurements give different signals indicating different instantaneous flows.

With the rigid tube (Teflon®), the peaks are high and spiked while with the flexible tube (Tygon®), the peaks are not very high and are wide. This is explained by the fact that the flexible tube deforms under the action of the pressure pulses generated by the pump in the fluidic circuit, thereby modifying the instantaneous flow rate at the measurement point.

With the integrated flowmeter, both experiments give very similar signals (the main peaks have the same amplitude and same width).

The conclusion may be drawn that the instantaneous flow in the pump is exactly measured with an integrated flowmeter and that this measurement is not affected by the connections of the fluidic circuit, and more generally remains independent of the hydraulic impedance of the assembly of the fluidic system. Thus, it becomes much simpler to analyze the performances of the pump by analyzing the time-dependent change in the instantaneous flow rate, since a modification in the shape of the signals will indicate a modification in the performances of the pump and not a modification in the hydraulic impedance characteristics of the whole of the fluidic network which may change over time during an experiment, or from one experiment to the other.

This experiment shows, that by means of a device of the type shown here, the measurement of the flow rate and the analysis of the performance of the pump are much more accurate and simpler than with a flowmeter placed upstream or downstream from the pump.

This improvement is particularly advantageous in a pumping system including a discardable portion (catheter, reservoir) and a reusable portion (the pump) which is for example the case of many portable systems for delivering a drug. It is important to have information on the state of the pump (ageing) which is not related to the remainder of the fluidic system. With a flow rate sensor integrated with the pump, it is possible to specifically analyze the performances of the pump, continuously during delivery of a drug, and at each time when the consumable portions (reservoir and/or catheter) are changed for a new injection period, even if the new catheter and the new reservoir have different hydraulic impedances. It is therefore not necessary to recalibrate the flow rate at each reuse.

The invention claimed is:

1. A micropump with a deformable membrane, comprising:
    a first chamber, one wall of which includes a first deformable membrane and an actuator of the first deformable membrane;
    a second chamber including a second deformable membrane and a third chamber, including a third deformable membrane, the second chamber and the third chamber being connected together through a first channel, a depth of the first channel being smaller than a depth of one of the second chamber and the third chamber, at least one of the second and third chambers being connected through a second channel to the first chamber, and the third chamber being between the first channel and the second channel;

each of the second chamber and third chamber having a detector associated therewith detecting deformation of the corresponding deformable membrane portion under action of a fluid flowing in the micropump, but not including an activation mechanism;

a first substrate; and a second substrate that is above the first substrate, the first substrate and the second substrate being assembled to each other, each of the chambers being made in the first substrate and being below the second substrate, each deformable membrane being made in the second substrate, the detector associated with the second chamber, the detector associated with the third chamber, and the actuator of the first deformable membrane all being positioned on a same upper surface of the second substrate.

2. The micropump according to claim 1, further comprising at least one fourth chamber connected to one of other chambers and including a fourth deformable membrane and an actuator of the fourth deformable membrane.

3. The micropump according to claim 1,
each of the second chamber and third chamber including 4 gauges forming a Wheatstone bridge;
or each of the second chamber and third chamber including 2 gauges, these 4 gauges forming a Wheatstone bridge, or these 4 gauges having identical rated values.

4. The micropump according to claim 1,
the second chamber and the third chamber being both located on a same side of the first chamber, only one of the second and third chambers being connected through the second channel to the first chamber.

5. The micropump according to claim 1, the second deformable membrane and the third deformable membrane having substantially constant thickness, or a thickness between 10 µm and 300 µm.

6. The micropump according to claim 1, the detectors of deformations each including: at least 2 gauges for each of the second and third chambers, one of the gauges being placed along a direction perpendicular to a general direction of flow of a fluid in the device, while the other gauge is placed along a direction substantially parallel to the general direction of flow of the fluid in the device; or at least one gauge localized in a vicinity of anchoring or of an edge of the deformable membrane corresponding to the chamber with which this gauge is associated; or at least one gauge, in a conducting material or in a doped semiconducting material; or at least one gauge having a width between 1 µm and 10 µm and a length between 10 µm and 100 µm.

7. A micropump with a deformable membrane, comprising:
a first chamber, one wall of which includes a first deformable membrane and an actuator of the first deformable membrane;
a second chamber including a second deformable membrane and a third chamber, including a third deformable membrane, the second chamber and the third chamber being connected together through a first channel, a depth of the first channel being smaller than a depth of one of the second chamber and the third chamber, at least one of the second and third chambers being connected through a second channel to the first chamber, and the third chamber being between the first channel and the second channel, each of the second chamber and third chamber further having a detector associated therewith of deformation of the corresponding deformable membrane portion under action of a fluid flowing in the micropump, but not including an activation mechanism;

a fourth chamber, connected to the second chamber through a channel and including a fourth deformable membrane and an actuator of the fourth deformable membrane;

a fifth chamber, connected to the first chamber or to the third chamber through a channel, and including a fifth deformable membrane and an actuator of the fifth deformable membrane;

a first substrate; and a second substrate that is above the first substrate, the first substrate and the second substrate being assembled to each other, each of the chambers being made in the first substrate and being below the second substrate, each deformable membrane being made in the second substrate, the detector associated with the second chamber, the detector associated with the third chamber, and the actuator of the first deformable membrane all being positioned on a same upper surface of the second substrate.

8. The micropump according to claim 7, the fourth chamber and/or the fifth chamber, the fourth deformable membrane, and its actuator, and/or the fifth deformable membrane and its actuator, forming one valve or two valves.

9. The micropump according to claim 7, further comprising a conduit opening into an inside of the fourth chamber, and/or of the fifth chamber, through an aperture edged with a lip protruding inside the fourth chamber, and/or of the fifth chamber, parallel with the fourth deformable membrane, and/or with the fifth deformable membrane.

10. A method for making a micropump that includes a first chamber, one wall of which includes a first deformable membrane and an actuator of the first deformable membrane, a second chamber including a second deformable membrane and a third chamber, including a third deformable membrane, the second chamber and the third chamber being connected together through a first channel, a depth of the first channel being smaller than a depth of one of the second chamber and the third chamber, at least one of the second and third chambers being connected through a second channel to the first chamber, and the third chamber being between the first channel and the second channel, each of the second chamber and third chamber having a detector associated therewith detecting deformation of the corresponding deformable membrane portion under action of a fluid flowing in the micropump, but not including an activation mechanism, the method comprising:

selecting a first substrate and a second substrate;

making the chambers and the first channel in the first substrate, the depth of the first channel being smaller than the depth of the one of the second chamber and the third chamber, and the third chamber being between the first channel and the second channel;

assembling the first substrate with the second substrate;

then making the deformable membranes, by thinning the second substrate; and forming the detectors, on or in the deformable membranes, the detectors including a detector being positioned above the third chamber and a detector being positioned above the second chamber, and forming an actuator of the first deformable membrane, the second substrate being above the first substrate, each of the chambers being made in the first substrate and being below the second substrate, each deformable membrane being made in the second substrate, the detector associated with the second chamber, the detector associated with the third chamber, and the actuator of the first deformable membrane all being positioned on a same upper surface of the second substrate.

11. The method according to claim 10, the deformable membranes being made by thinning the second substrate from an upper face of the second substrate, by mechanical polishing, or by mechano-chemical polishing, and/or etching.

12. The method according to claim 10, the second substrate being of SOT type, includes a semiconducting substrate, a dielectric layer, and a layer in a semiconducting material.

13. The method according to claim 10, further comprising making at least one fourth chamber connected to one of the other chambers and including a fourth deformable membrane, and making an actuator of the fourth deformable membrane.

14. The method according to claim 10, further comprising making an inlet conduit and an outlet conduit in the first substrate.

15. The method according to claim 14, the inlet and outlet conduits first being made blind in the first substrate, and then being made as through-conduits after the forming of the detector and the forming of the actuator of the first deformable membrane, by thinning of the first substrate.

16. The method according to claim 10, the detectors including gauges made by metal deposition on the deformable membranes or by doping of a semiconducting material.

17. A micropump with a deformable membrane, comprising:
a first chamber, one wall of which includes a first deformable membrane and means for actuating the first deformable membrane;
a second chamber including a second deformable membrane and a third chamber, including a third deformable membrane, the second chamber and the third chamber being connected together through a first channel, a depth of the first channel being smaller than a depth of one of the second chamber and the third chamber, at least one of the second and third chambers being connected through a second channel to the first chamber, and the third chamber being between the first channel and the second channel;
each of the second chamber and third chamber having detection means associated therewith for detecting deformation of the corresponding deformable membrane portion under action of a fluid flowing in the micropump, but not including activation means;
a first substrate; and
a second substrate that is above the first substrate, the first substrate and the second substrate being assembled to each other, each of the chambers being made in the first substrate and being below the second substrate, each deformable membrane being made in the second substrate, the detection means associated with the second chamber, the detection means associated with the third chamber, and the means for actuating the first deformable membrane all being positioned on a same upper surface of the second substrate.

18. The micropump according to claim 17,
each of the second chamber and third chamber including 4 gauges forming a Wheatstone bridge;
or each of the second chamber and third chamber including 2 gauges, these 4 gauges forming a Wheatstone bridge, or these 4 gauges having identical rated values.

19. The micropump according to claim 17,
the second chamber and the third chamber being both located on a same side of the first chamber, only one of the second and third chambers being connected through the second channel to the first chamber.

20. The micropump according to claim 17, the detectors of deformations each including: at least 2 gauges for each of the second and third chambers, one of the gauges being placed along a direction perpendicular to a general direction of flow of a fluid in the device, while the other gauge is placed along a direction substantially parallel to the general direction of flow of the fluid in the device; or at least one gauge localized in a vicinity of anchoring or of an edge of the deformable membrane corresponding to the chamber with which this gauge is associated; or at least one gauge, in a conducting material or in a doped semiconducting material; or at least one gauge having a width between 1 μm and 10 μm and a length between 10 μm and 100 μm.

21. A micropump with a deformable membrane, comprising:
a first chamber, one wall of which includes a first deformable membrane and means for actuating the first deformable membrane;
a second chamber including a second deformable membrane and a third chamber, including a third deformable membrane, the second chamber and the third chamber being connected together through a first channel, a depth of the first channel being smaller than a depth of one of the second chamber and the third chamber, at least one of the second and third chambers being connected through a second channel to the first chamber, the third chamber being between the first channel and the second channel, and each of the second chamber and third chamber further having detection means associated therewith for detecting deformation of the corresponding deformable membrane portion under action of a fluid flowing in the micropump, but not including activation means;
a fourth chamber, connected to the second chamber through a channel and including a fourth deformable membrane and means for actuating the fourth deformable membrane;
a fifth chamber, connected to the first chamber through a channel, and including a fifth deformable membrane and means for actuating the fifth deformable membrane;
a first substrate; and
a second substrate that is above the first substrate, the first substrate and the second substrate being assembled to each other, each of the chambers being made in the first substrate and being below the second substrate, each deformable membrane being made in the second substrate, the detection means associated with the second chamber, the detection means associated with the third chamber, and the means for actuating the first deformable membrane all being positioned on a same upper surface of the second substrate.

22. The micropump according to claim 21, the fourth chamber and/or the fifth chamber, the fourth deformable membrane, and its means for actuating, and/or the fifth deformable membrane and its means for actuating, forming one valve or two valves.

23. The micropump according to claim 21, further comprising a conduit opening into an inside of the fourth chamber, and/or of the fifth chamber, through an aperture edged with a lip protruding inside the fourth chamber, and/or of the fifth chamber, parallel with the fourth deformable membrane, and/or with the fifth deformable membrane.

* * * * *